United States Patent [19]

Clauss et al.

[11] 4,140,208

[45] Feb. 20, 1979

[54] CENTRIFUGALLY ENGAGED SERVO CLUTCH FOR TORQUE CONVERTER LOCK-UP

[75] Inventors: Julius A. Clauss, Birmingham; Joseph G. Salmonowicz, Lapeer, both of Mich.

[73] Assignee: Borg-Warner Corporation, Chicago, Ill.

[21] Appl. No.: 732,264

[22] Filed: Oct. 14, 1976

[51] Int. Cl.² ............... F16H 41/18; F16D 43/14
[52] U.S. Cl. .......................... 192/3.31; 192/45.1; 192/75; 192/103 B
[58] Field of Search ............ 192/38, 75, 105 BA, 192/103 B, 41 R, 3.31, 54, 45.1

[56] References Cited

U.S. PATENT DOCUMENTS

| | | | |
|---|---|---|---|
| 2,184,606 | 12/1939 | Lavaud | 192/3.31 X |
| 2,235,673 | 3/1941 | Dodge | 192/3.31 |
| 2,965,206 | 12/1960 | Moule et al. | 192/105 BA |
| 3,610,382 | 10/1971 | Rosemere | 192/105 BA |

FOREIGN PATENT DOCUMENTS

| | | | |
|---|---|---|---|
| 886762 | 10/1942 | France | 192/105 BA |
| 894201 | 4/1962 | United Kingdom | 192/3.31 |

*Primary Examiner*—Benjamin W. Wyche
*Attorney, Agent, or Firm*—Robert L. Zieg

[57] ABSTRACT

A speed-responsive engaging mechanism adapted for use in a hydrodynamic device to couple turbine and impeller members including a disc secured to the turbine member having a series of convexly curved cam surfaces thereon formed in apertures in the discs with a series of friction shoe assemblies mounted in the apertures in engagement with the cam surfaces. The friction shoe assemblies engage with the impeller at a predetermined speed of rotation of the turbine member, and the curved cam surface induces a wedging engagement of the shoes with the impeller member. Spring means are provided to retain the shoe assemblies in the apertures, and a roller mechanism is provided in each shoe assembly to provide relatively frictionless relative movement between the cam surfaces and the shoe assemblies. Each shoe in the assembly is made of a sintered metal material and has a spring retaining structure cast in the shoe.

6 Claims, 6 Drawing Figures

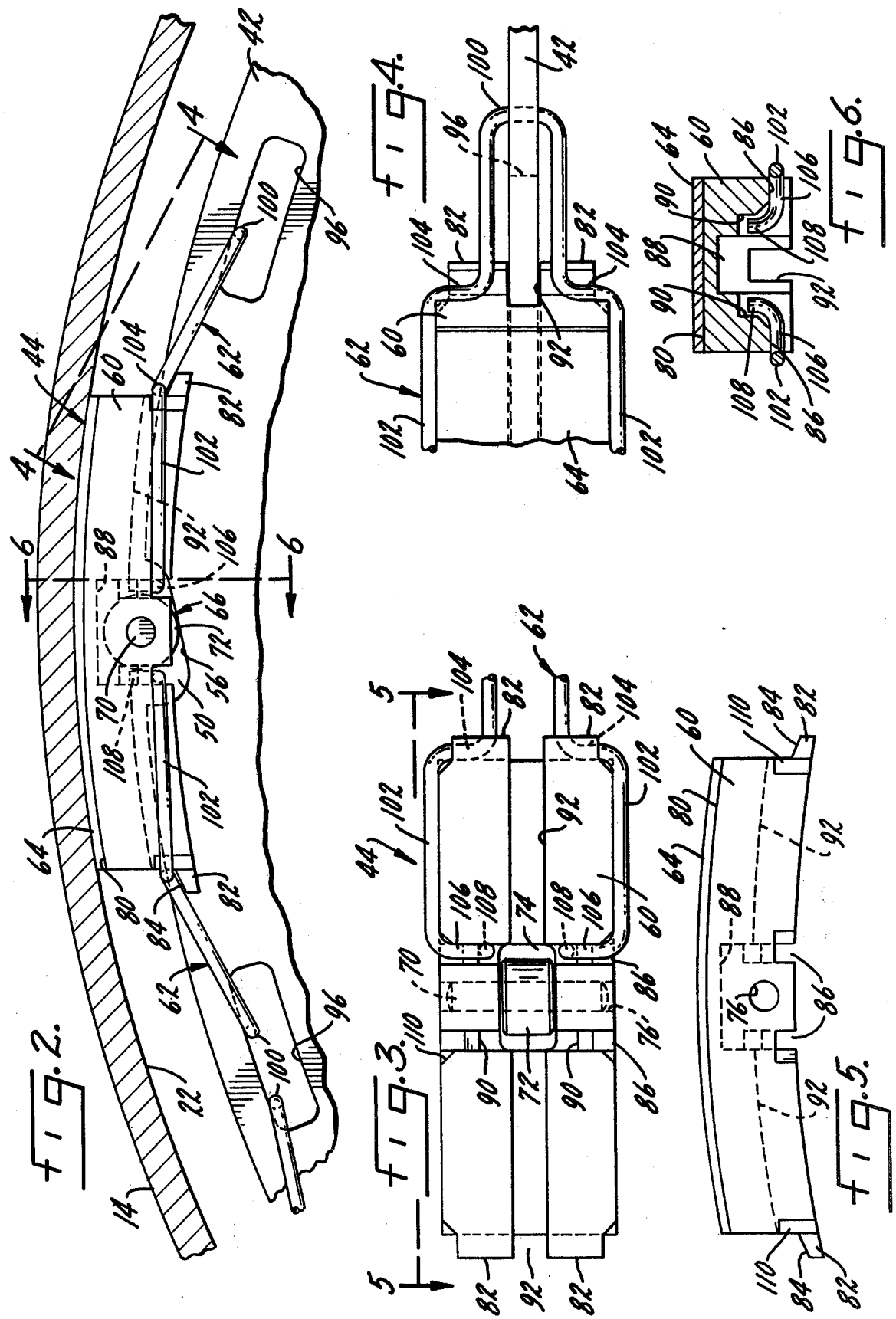

CENTRIFUGALLY ENGAGED SERVO CLUTCH FOR TORQUE CONVERTER LOCK-UP

BACKGROUND OF THE INVENTION

1. Field of the Invention

This application relates to the field of speed-responsive engaging devices for hydrodynamic devices.

2. Prior Art

It is known in the prior art to provide lock-up clutches for hydrodynamic devices. More particularly, copending applications, Ser. No. 620,461 filed Oct. 7, 1975 now U.S. Pat. No. 4,049,094 and Ser. No. 700,998 filed June 29, 1976 now U.S. Pat. No. 4,063,623 of common assignee provide clutch mechanisms for hydrodynamic devices having a shoe assembly engaged by centrifugal force and, in addition, engaged by a wedging effect of cam surfaces and such clutch devices lock together the impeller and turbine elements to improve efficiency by eliminating slippage. It has been recognized that the structures of the aforementioned applications as well as the device to be described herein provide a solution to the problem of lock-up clutches to provide a lock-up clutch which disengages during torque impulses or torque reversals to provide smooth, shockless operation and eliminate torsional vibrations.

These previous solutions to the torque converter clutch problem, although workable and dramatic improvements over those known prior, have a somewhat sensitive characteristic which can be vastly improved. This identified need for improvement is in the area of engagement between the shoe assemblies and the cam itself. The previous solutions had a sliding engagement between the shoe assemblies and the cam surface. This type of construction induces a certain amount of frictional resistance to movement of the shoe assemblies along the cam surface. The ideal shoe assembly in a clutch environment of the type disclosed in the foregoing applications would have no frictional resistance to the movement of the shoe assemblies upon the cam surface. In addition, there remains the problem of minimizing the machining to be done on each shoe and to provide a simplified assembly.

SUMMARY OF THE INVENTION

The present invention achieves all of the desirable objects listed above and provides an improved clutch mechanism for a hydrodynamic device in which there is relatively minimum frictional resistance to movement of the shoe assemblies along the cam surface of the clutch. The present invention uniquely solves this problem by providing a roller within the shoe assembly, the roller being mounted to be in engagement with the cam surface and to roll as the shoe assembly moves along the cam surface to minimize frictional resistance to such movement. As will be apparent from a description of the present invention, a simplified shoe assembly is provided having a minimum of parts to provide the roller mechanism within the shoe assembly. The shoe is made from sintered metal in a preferred embodiment whereby the spring retaining structure may be cast in the shoe. Further, use of wire springs mounted through openings in the clutch disc and snapping into place in the shoe obviates the requirement of any welding, riveting or other securing techniques to secure the assembly together.

BRIEF DESCRIPTION OF THE DRAWINGS

FIG. 2 is a sectional view taken along the lines 2—2 of FIG. 1;

FIG. 3 is a bottom view of the shoe assembly in FIG. 2;

FIG. 4 is a partial view of the shoe and spring of FIG. 2 taken in the plane of lines 4—4 in FIG. 2;

FIG. 5 is a view of the shoe taken in the plane lines 5—5 of FIG. 3; and

FIG. 6 is a sectional view taken along the lines 6—6 of FIG. 2.

BRIEF DESCRIPTION OF THE PREFERRED EMBODIMENT

Figure 1:
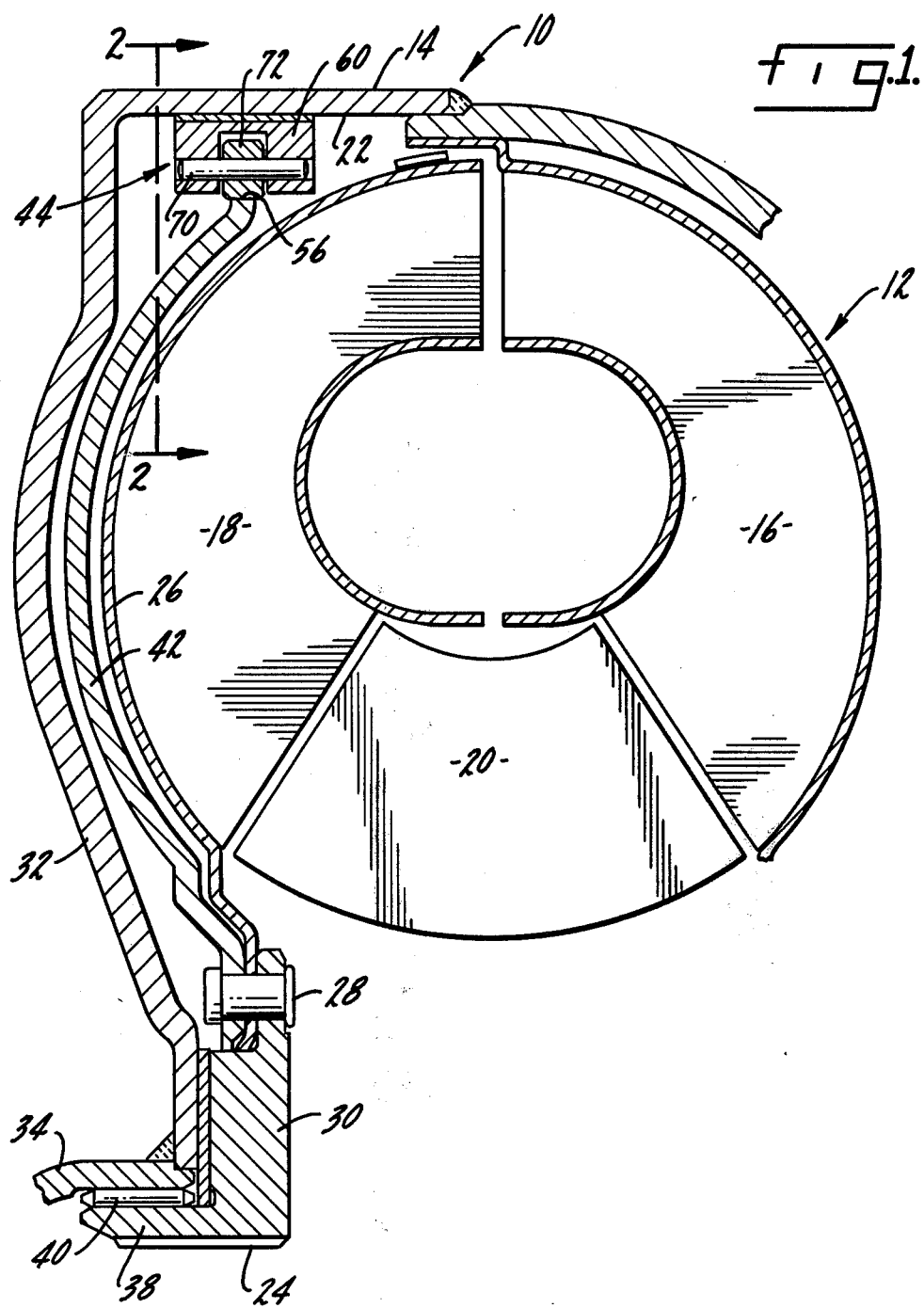
FIG. 1 is a cross-sectional view through a clutch mechanism for a hydraulic torque converter.

Referring to FIG. 1, an improved lock-up clutch or engaging mechanism 10 is disclosed. Clutch 10 is shown in a hydrodynamic device 12 which may be a hydraulic torque converter having a drive shell 14 connected to drive a vaned impeller member 16. Torque converter 12 includes a vaned turbine member 18 driven hydrodynamically by impeller 16 and includes a stator member 20. The improved lock-up clutch 10 is operative to lock the turbine to the impeller by means of frictional engagement between clutch 10 and an inner annular surface 22 in shell 14.

Turbine 18 includes an outer radial vaned portion 26 which is connected to a hub 30 by rivets 28. Hub 30 is splined at 24 to be connected to a transmission input shaft as is known in the art. Drive shell 14 includes a radially extending portion 32 connected to a central hub 34 which is driven by the engine of the vehicle. Hub 30 of turbine 18 includes an axially extending bearing portion 38. A bearing 40 is provided mounting hub 30 within hub portion 34. Turbine 18 is thus mounted for concentric rotation within shell 14 to provide for concentric rotation between the turbine and impeller 16.

The unique clutch 10 of the present invention is comprised of an annular curved disc 42 and friction devices or shoe assemblies 44. Disc 42 is concentrically mounted upon turbine hub 30 and is secured thereto by rivets 28. Annular disc 42 is curved to conform with the shape and curvature of turbine 18 and radial portion 32 to provide minimum space requirements for clutch mechanism 10 within torque converter 12. As illustrated in FIG. 2, disc 42 has a series of apertures or ramp areas 50 in which shoe assemblies 44 are mounted. Provided within each aperture 50 is a cam surface or ramp 56. The cam surfaces 56 have a relatively slight curvature for purposes to be described later.

Shoe assemblies 44 are particularly illustrated in FIGS. 2, 3, 4, 5 and 6. Shoe assemblies 44 are comprised of a rectangular friction shoe 60 being generally arcuate in cross-section to conform with the arcuate shape of surface 22. Assembled to shoe 60 is a spring 62 at either end thereof and a friction lining 64. Also assembled to the shoe is a roller mechanism 66. Roller mechanism 66 is comprised of a roller pin or axle 70 upon which a roller 72 is mounted. Roller 72 is centrally mounted in shoe 60 in a rectangular slot 74 upon axle 70. Axle 70 is received in a cylindrical bore or journal 76 extending through shoe 60.

The shoe 60 is in a preferred form made by a sintered metal process such as by a powdered metal technique such that the shoe may be cast to nearly its finished shape. The roller assembly 66 is assembled to the shoe by placing the roller 72 in slot 74 and then pressing the axle or pin 70 through the center of the roller. Thus, the roller will turn with axle 70 within shoe 60. In this way, the roller is supported in its rotation over the entire length of the pin 70 and the force acting on the roller is over a large area within the shoe 60.

The friction lining 64 is bonded to an external arcuate surface 80 on shoe 60. The lining may be of paper as is in a preferred embodiment of the invention or any of the other known types of friction material used in friction engaging devices.

The spring 62 is of continuous wire and is preformed such that two of the springs 62 serve to retain the shoe 60 upon the disc 62 and also resist outward movement of the shoe 60 under centrifugal force. Shoe 60 has structure to accommodate the spring 62. Shoe 60 includes a pair of lips or ears 82 at either end thereof which have an outer angular surface 84 thereon. Provided centrally of shoe 60 are a pair of slots 86 on either side of the center of shoe 60 and, in addition, on either side of the roller assembly 66 such that there are four slots 86. As illustrated in FIGS. 5 and 6, the slots 86 open into a cast in opening 88 within the center of the shoe in the area of the slot 74 which accommodates roller 72. Shoulders 90 are formed within opening 88 on each side thereof. The opening 88 has the shape illustrated in FIG. 5 on both sides of the roller assembly 66 such that the pair of springs 62 for each end of the shoe 60 are accommodated and secured at their inner ends within openings 88. Also extending centrally of the shoe and longitudinally thereof is a groove 92 which receives the edge of disc 42 such that groove 92 serves as a guide for arcuate movement of the shoe with respect to disc 42. While restricting axial movement of the shoe relative to the disc thereby providing axial or longitudinal location of the side.

Also provided in disc 42 near the periphery thereof are a series of equally spaced slots or openings 96, there being an opening 96 at either end of each of ramp areas 50. Spring 62 has a U-shaped section 100 which is received within slot 96 such that the spring will be retained within disc 42. Spring 62 has widened portions 102 which run along either side of the shoe 60. A transverse section 104 extends at right angles to and joins portions 102 with section 100 on either side of spring 62. Terminal sections 106 extend inwardly at right angles to portions 102 and are located within slots 86 in the central area of shoe 60. Terminal portions 106 have end sections 108 thereon which extend radially outwardly as pictured in FIG. 6, the ends 108 being received within the area of shoulders 90. Sections 104 of the spring engage with angular surfaces 84 on ears 82, the surface 84 thus being a reaction surface for the spring as will be explained.

Springs 62 are assembled to the shoe by first inserting the spring through the slot 96 and then snapping the spring within the shoe 60 by having sections 104 in engagement with angular surface 84, then bending sections 102 of the spring down until portions 106 and end portions 108 clear the bottom of the shoe such that they can be snapped into slots 86 and opening 88 and end portions 108 move into the area of shoulders 90 as illustrated in FIG. 6. Thus the springs 62 snap over the shoe 60 on either end of the shoe 60.

When springs 62 are in position, as illustrated in FIG. 2, they serve to hold the shoe 60 in place with the roller 72 engaging cam surface 56, since the portions 104 will react on surface 84 and section 100 will act on the upper part of openings 96 to pull the shoes radially inwardly since the spring 62 is bent to assume the position illustrated in FIG. 2 and has an inherent resiliency tending to straighten the spring out. Chamfers 110 are provided on each corner of shoes 60 in the area of ears 82 to facilitate assembly of spring 62 to shoe 60.

Further, as can be seen in FIG. 2, section 100 of springs 96 may move arcuately relative to disc 42 within slot 96 to accommodate radially outward and arcuate movement of shoe 60.

As described above, the unique roller mechanism 66 rolls on cam surface 56 as assembly 44 moves arcuately and, thus, provides a relatively frictionless engagement between cam 56 and shoe assembly 44.

The operation of the engaging mechanism 10 of the present invention is that initially the shoe assemblies will be in their retracted position, i.e., the shoe 60 not in engagement with surface 22. As impeller 16 is rotated, as would be the case when the vehicle is to be moved forward from a stopped position, turbine 18 will begin to rotate, and as the speed increases, shoe assemblies 44 will move outwardly in response to centrifugal force against the force of springs 62. When shoes 60 and, in particular, friction material 64 engage surface 22, assembly 44 will move arcuately with respect to disc 42 along cam 56 in a clockwise direction, as illustrated in FIG. 2. The roller assembly 66 rolls along surface 56, section 100 of spring 62 moves arcuately within opening 96, and due to the wedging action of cam surface 56, shoes 60 will be wedged into engagement with surface 22 to lock turbine 18 to shell 14 such that impeller 16 and turbine 18 rotate together as a unit. The engaging force is multiplied as a function of the cam angle to increase torque carrying capacity.

The engaging mechanism 10 of the present invention, when installed in a hydraulic torque converter as used in an automotive automatic transmission, will release under several conditions which are desired in an environment of this type. The release and reengagement of the clutch 10 occurs due to the inherent structure of the device without the requirement of any outside controls.

It is to be understood that the use of the term "disengaged" herein is meant to indicate a condition in which shoes 60 move radially inwardly out of contact with surface 22. When the term "released," as applied to clutch 10, is used herein, it is intended to include a condition in which shoes 60 may still be in contact with surface 22, but the engaging forces are such that slipping of surface 22 with respect to shoes 60 may take place or, in other words, turbine 18 and impeller 16 may rotate at different speeds.

Due to the design of clutch 10, when the clutch is locked up during operation of the vehicle and the throttle of the vehicle is suddenly depressed to demand higher torque, the drive-line torque will rise to a greater value than the torque capacity of clutch 10 causing clutch 10 to release and allowing the hydraulic torque converter to return to slipping condition, which is desired at such times. This condition may also occur on upshifts in the transmission when a sudden surge or increase in torque will occur momentarily.

When a torque reversal occurs in the drive-line, due to the inherent characteristics of clutch 10, the wedging effect is removed, and the torque capacity of clutch 10 drops to a lower value. Thus, the clutch momentarily releases on down shifts, since a torque reversal may occur at such times. As known in the art, during shifting, release of clutch 10 is desired to allow the converter to return to its shock absorbing characteristics.

It has also been found during test work that upon shifting or ratio changing in an automatic transmission with the present device installed, the torque pulse or reversal which occurs during a shift allows the lock-up clutch 10 to release under these conditions. This inherent feature of the present design is extremely important in that automatic shifts are much smoother when a hydraulic torque converter is operating in its released or normal manner; and if a torque converter is locked up, as, for example, by a conventional lock-up clutch at the time of the shift, the shift could be much harsher than desirable.

The operational characteristics of the torque converter clutch as set out above are more fully explained in above-mentioned copending application, Ser. No. 620,461 filed Oct. 7, 1975, and reference may be had thereto for a fuller understanding of such characteristics.

It is to be noted that upon engagement of shoes 60 with surface 22, the shoe assemblies can rock on the cam surface 56 about roller assembly 66 to self-align with respect to the clutch surface 22.

As mentioned above, cam surfaces 56 are convexly curved, and since the surface on roller 72 is cylindrical, there is line contact between roller 72 and cam surface 56. The purpose of having cam surface 56 curved is to maintain a uniform wedge angle regardless of the position of the friction shoe along the cam surface. As will be recognized by those of ordinary skill in the art, the wedge angle is the angle between a radius drawn from the center of curvature of surface 56 through the point of contact between surface 56 and roller surface 72 and extending to the center of axle 70, and a radius drawn from the center of rotation of internal clutch surface 22 and the center of axle 70. It will also be recognized by those skilled in the art that if cam surface 56 is a flat surface, the wedge angle will vary significantly as the friction shoe moves along surface 56. It will be readily apparent that for the device to function best, it is important to have a constant wedge angle to maintain constant torque capacity even with dimensional variation of the parts.

The wedge angle used, which can be established by varying the center of curvature of surface 56, may be selected from a wide range of angles, the major requirement being the wedge angle must be greater than the angle of friction for the device to engage and disengage properly. As is known, the friction angle is a specific angle for particular types of materials in engagement, being the angle of inclination to an inclined plane on which a body will just overcome its tendency to slide, the inclined plane and the body being of the materials for which the friction angle is to be established.

As described above, the present invention includes roller mechanism 66 which prevents shoe assembly 60 from binding or sticking as it moves along cam surface 56 to provide a relatively frictionless arcuate movement of shoe 60. This principle is also shown and described in copending application Ser. No. 732,265 filed Oct. 14, 1976, now U.S. Pat. No. 4,083,440, of common assignee, which shows and describes a distinct form of shoe assembly. However, the structure in the copending application mentioned does not contemplate the unique shoe 60 described herein which is made of a cast type of material whereby the various structural features to engage with the spring can be cast in the material and relatively little machining is required, the machining being only boring or drilling of hole 76 for pin 70.

In addition, the unique shoe assembly 60 of the present invention is secured and retained within the assembly merely by snapping the springs 62 into place on shoe 60, thus eliminating any need for welding or riveting or other securing techniques which are necessary with a shoe assembly of the type described in the above-mentioned copending application.

Various of the features of the invention have been particularly shown and described, however, it should be obvious to one skilled in the art that modifications may be made therein without departing from the scope of the invention.

What is claimed is:

1. An engaging mechanism comprising, first and second relatively rotating members, an annular disc fixed to said first member, a plurality of shoe assemblies mounted in said disc, cam means on said disc, said shoe assemblies including roller means in engagement with said cam means, said shoe assemblies having a frictional surface thereon, centrifugal force acting to urge said shoe assemblies into engagement with said second member at a given speed of rotation, means retaining said shoe assemblies on said disc, said shoe assemblies rolling along said cam means after initial engagement whereby said assemblies are wedged between said disc and said second member and wherein said cam means comprises a surface curved to provide a uniform wedge angle of engagement between said surface and said assemblies regardless of the position of said shoe assemblies along said surface.

2. An engaging mechanism comprising, first and second relatively rotating members, an annular disc fixed to said first member, a plurality of shoe assemblies mounted in said disc, cam means on said disc, said shoe assemblies including roller means in engagement with said cam means, said shoe assemblies having a frictional surface thereon, centrifugal force acting to urge said shoe assemblies into engagement with said second member at a given speed of rotation, means retaining said shoe assemblies on said disc, said shoe assemblies rolling along said cam means after initial engagement whereby said assemblies are wedged between said disc and said second member, said retaining means comprises spring means extending through holes in said disc and having end portions received within the central portion of the shoe assemblies, wherein a spring is provided for each end of said shoe assembly, said spring being releasably connected to said shoe assembly.

3. An engaging mechanism comprising, first and second relatively rotating members, an annular disc fixed to said first member, a plurality of shoe assemblies mounted in said disc, cam means on said disc, said shoe assemblies including roller means in engagement with said cam means, said shoe assemblies having a frictional surface thereon, centrifugal force acting to urge said shoe assemblies into engagement with said second member at a given speed of rotation, means retaining said shoe assemblies on said disc, said shoe assemblies rolling along said cam means after initial engagement whereby said assemblies are wedged between said disc and said second member wherein each said shoe assembly includes a shoe and a roller assembly, said shoe having a central slot, said roller assembly including an axle and a roller, said axle being mounted in said shoe, and said roller being mounted on said axle and received in said slot.

4. A clutch mechanism for a hydraulic torque converter having impeller and turbine elements comprising an annular disc fixed to said turbine element, a plurality of shoe assemblies mounted in said disc, cam means on said disc, said shoe assemblies including roller means in engagement with said cam means, said assemblies having a frictional surface thereon, centrifugal force acting to urge said assemblies into engagement with said impeller element at a given speed of rotation, means retaining said shoe assemblies on said disc, said assemblies rolling along said cam means after initial engagment whereby said assemblies are wedged between said disc and said impeller element and a spring is provided for each end of said shoe assembly, said spring being releasably connected to said shoe, wherein each said shoe assembly includes a shoe and a roller assembly, said shoe having a central slot, said roller assembly including an axle and a roller, said axle being mounted in said shoe, and said roller being mounted on said axle and received in said slot.

5. A mechanism as claimed in claim 4 wherein each said shoe has a central groove extending its entire length, said disc being received within said groove whereby said disc guides said shoe when it moves along said cam means.

6. A mechanism as claimed in claim 4 wherein said shoe is made of sintered metal.

* * * * *